(12) United States Patent
Kurhekar et al.

(10) Patent No.: US 7,254,809 B2
(45) Date of Patent: Aug. 7, 2007

(54) COMPILATION OF UNIFIED PARALLEL C-LANGUAGE PROGRAMS

(75) Inventors: Manish Kurhekar, New Delhi (IN); Pradeep Varma, New Delhi (IN); Rajkishore Barik, Zurich Witikon (CH)

(73) Assignee: International Business Machines Corporation, Armonk, NY (US)

( * ) Notice: Subject to any disclaimer, the term of this patent is extended or adjusted under 35 U.S.C. 154(b) by 693 days.

(21) Appl. No.: 10/630,023

(22) Filed: Jul. 30, 2003

(65) Prior Publication Data
US 2005/0028141 A1 Feb. 3, 2005

(51) Int. Cl.
G06F 9/45 (2006.01)
G06F 9/44 (2006.01)

(52) U.S. Cl. .................. 717/146; 717/116; 717/149

(58) Field of Classification Search ............... 717/140
See application file for complete search history.

(56) References Cited

U.S. PATENT DOCUMENTS

| | | | | |
|---|---|---|---|---|
| 5,752,036 | A * | 5/1998 | Nakamura et al. | 717/149 |
| 5,940,620 | A * | 8/1999 | Graham | 717/158 |
| 6,106,575 | A * | 8/2000 | Hardwick | 717/119 |
| 6,253,370 | B1 | 6/2001 | Abadi et al. | |
| 6,760,906 | B1 * | 7/2004 | Odani et al. | 717/149 |

OTHER PUBLICATIONS

A.V. Aho; R. Sethi, J.D. Ullman, Compilers Principles, Techniques, and Tools, 1998, pp. 1-23, 83-87, 159-171, 463-472, 513, 585-591, Addison-Wesley Publishing Company.
T.A. El-Ghazawi, W.W. Carlson, J.M. Draper, UPC Language Specifications V1.1, Mar. 24, 2003, University of California Berkely and National Energy Research Scientific Computing Center, Lawrence Berkeley National Laboratory, Office of Science, US Department of Energy (http://upc.nersc.gov).
Wei Chen, The Berkely UPC Compiler, Mar. 2003, Open64 User Forum, International Symposium on Code Generation and Optimization, San Francisco, CA.

* cited by examiner

Primary Examiner—Tuan Dam
Assistant Examiner—Isaac Tecklu
(74) Attorney, Agent, or Firm—Gibb & Rahman, LLC; Marc McSwain, Esq.

(57) ABSTRACT

Methods, compiler apparatus and a computer program product for compiling UPC source code are disclosed. UPC-unique constructs are converted into C-level form. The C-level constructs are inserted into the source code to form a combined code. The combined code is translated into an intermediate form, wherein any surviving UPC-unique components are discarded. All UPC-unique data or statements are converted to a form that can be handled by general compiler architectures, yet retain UPC properties. The resultant intermediate form is converted to compiled machine code. The generation of C-level constructs occurs at a compiler front end module, avoiding difficulties in intermediate code handling.

36 Claims, 4 Drawing Sheets

COMPILATION OF UNIFIED PARALLEL C-LANGUAGE PROGRAMS

FIELD OF THE INVENTION

The invention relates to the compilation of Unified Parallel C-language (UPC) programs.

BACKGROUND

A compiler generally includes a frontend that translates source code into an intermediate form. An intermediate form processor optimizes the intermediate form. A backend then converts the optimized intermediate form code into, typically, machine language code. A reference, that teaches source-to-source translation and translation after mapping to a smaller intermediate code, is A. V. Aho, R. Sethi, and J. D. Ullman, "Compilers Principles, Techniques, and Tools", Addison-Wesley Publishing Company, Reading, Massachusetts, 1988. Reference is made to chapter 1, that introduces compiling, to chapter 3, section 1 regarding lexical analyzers, to chapter 4, sections 1 and 2 dealing with parsers and context-free grammars, to chapter 8, section 1 dealing with intermediate languages, to the introduction of chapter 9 on code generation generally, and to the introduction to chapter 10 on code optimaization. intermediate compile mechanism that performs wide compilation functions without changing existing program makefiles. The intermediate compile mechanism supports cross-module inline substitutions and passing of arguments to registers, to improve execution times of executable programs.

U.S. Pat. No. 6,253,370 (Abadi et al), issued Jun. 26, 2001, teaches a method and apparatus that can be applied in a pre-compiler environment to annotate a computer program to facilitate subsequent processing of a program. Code representing the program is generated at a first computer system. Annotations are generated for the code that provide information about the code. At a second computer, the code is processed according to the information provided by the annotations. The annotations, for example, can indicate a control flow graph representing a flow of execution of the code. Also, the information provided by the annotations can be a register allocation that maps data structures of the code to registers of the second computer system.

UPC is a parallel extension to ANSI C, based on a distributed, shared-memory programing paradigm. It provides a common syntax and semantics for writing high-perfomance, explicitly parallel programs in C. An example of UPC is taught by T. A. El-Ghazawi, W. W. Carlson, and J. M. Draper, "UPC Language Specifications V1.1", issued Mar. 24, 2003, as a joint work, by the University of California Berkeley and the National Energy Research Scientific Computing Center, Lawrence Berkely National Laboratory, Office of Science, US Department of Energy.

UPC has a number of constructs in addition to ANSI C. They can be classified into three categories:
1. Data types—shared, strict and relaxed with blocking factors.
2. Statements—forall
3. Synchronization constructs—barrier, lock, etc.

A convenient approach to implementing UPC compiler using an existing C-compiler, is to define a UPC run-time library that can be targeted by a compiler in generating code. The amount of code generation required of the compiler is substantial, involving generation at points of declaration, initialization, read and write of shared entities. In a document authored by Wei Chen, "The Berkely UPC Compiler", published at the Open64 User Forum, International Symposium on Code Generation and Optimization, San Francisco, Calif., in March 2003, it is taught that proxy data structures are used to represent shared entities, and communication for read and write of the shared entities is carried out with reference to these proxy (but ordinary C) data structures. Manipulating (e.g. initializing proxy, initializing remote data, communication via proxy) a proxy involves manipulating its internal fields and values, which has to be reflected in the generated code. In order to be compiler independent, the Chen reference chooses a C-level intermediate form in which reads and writes are transformed into calls in a runtime library.

The need exists, however, for a compiler to further ease the code generation aspects of translating UPC programs and to correctly handle UPC program constructs. This is particularly so for nested forall statements.

SUMMARY

The gist of the invention is to generate C-level code strings for UPC constructs to be spliced into the source UPC program and then translated to intermediate form for optimization. Any UPC-unique components are discarded during optimization and the resultant intermediate form is then compiled as machine code.

The C-level form constructs are converted to a form having proxy declarations. The proxy declarations for UPC data constructs include a name that is a mangled version of the name of the respective UPC-unique data component having a one-to-one mapping.

The proxy declarations for a (UPC statement include a conditional statement. For forall statements, the conditional statement has predicates leading to evaluation based upon an affinity test.

All UPC-unique data or statements are thus converted to a form that can be handled by general compiler architectures, yet retain UPC properties.

DETAILED DESCRIPTION

Introduction

Figure 1:
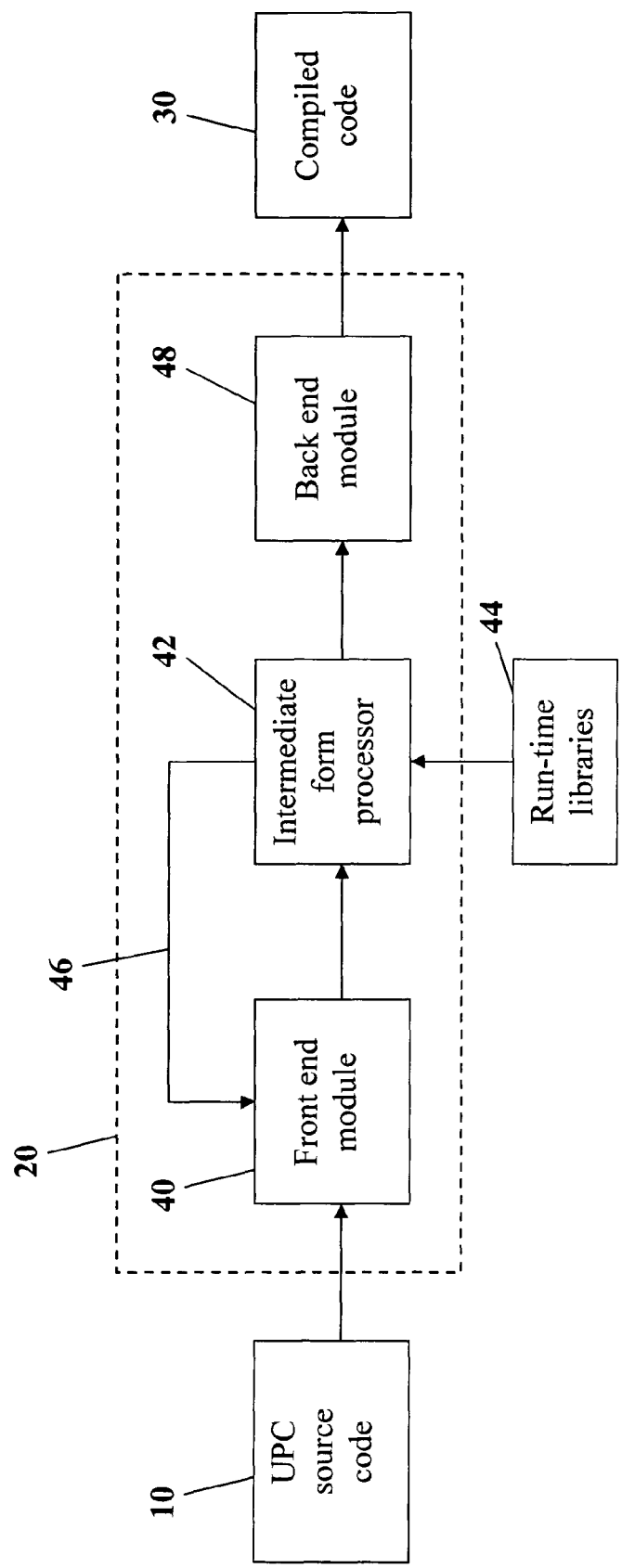
FIG. 1 is a schematic block diagram of a UPC compiler.

As mentioned, a unique programming construct made available by UPC is a forall statement that allows programmers to describe a loop, wherein loop iterations/indices are partitioned among threads based on a notion of thread affinity. In using the construct, a user only specifies an additional affinity expression compared to C's "for" loop. Assignment of threads to loop iterations based on the affinity expression is left to the UPC implementation to carry out.

UPC's threads are global in nature and UPC's forall construct is also designed to be global in nature. Nesting of forall loops is intricate and not contained within the (static)

code boundaries of any given procedure. Nesting may be defined as: if the loop body of a upc_forall statement contains one or more upc_forall statements, either directly or through one or more function calls, the construct is called a nested upc_forall statement. A nested upc_forall statement is thus very different from the commonplace intra-procedural definition of nested loops. The efficient and correct implementation of UPC's forall statement in its generality is a non-trivial task.

It is useful to illustrate the UPC forall construct and assignment of loop iterations to threads by use of an example. The following code fragment presents three simply nested forall loops:

```
int i,j,k;
shared float *a, *b, *c;
upc_forall(i=0; i<N; i++; continue)
    upc_forall(j=0; j<N; j++; &a[j])
        upc_forall(k=0; k<N; k++; &b[k])
            a[j] = b[k] * c[i];
```

The fourth expression in each loop header (within parentheses) is the affinity expression associated with the loop.

UPC semantics requires identifying the outermost upc_forall statement whose affinity expression is not "continue" as the controlling upc_forall statement. Only a controlling upc_forall statement partitions its instances for parallel execution on a thread by thread basis. In the above example, the loop using the index variable "j" is the controlling upc_forall statement. All iterations of the "i" and "k" indexed foralls are carried out by each thread and only iterations of the "j"-indexed forall are partitioned among threads using an affinity-based predicate. Among the iterations given in the controlling loop above, a given thread only carries out those iterations for which the predicate "upc_thread(&a[j])==MYTHREAD" is true for the thread.

UPC is designed such that its types are only a minor variation of ordinary C types, comprising of annotations like "shared", "strict"/"relaxed", and (an integral) blocking factor. The simplicity of these UPC variations is such that passing on the (unprocessed) variations as annotational information to an intermediate form is straightforward. This can be done using standard compiler means (such as "info" opcodes as used for transporting annotational information such as source locations for error/debug messages). While this makes modifying a standard C-compiler frontend to catch and pass-on UPC-related annotations to the intermediate form a straightforward task, challenges arise in digesting the annotations at the intermediate-form level. Maximizing code generation as C code strings, that can be straightforwardly spliced into the original code, is superior to generating only intermediate-code strings and splicing them in the intermediate code directly. The latter, standard method is difficult to apply in the UPC context because the amount of code generation per annotation is substantial, which becomes larger when expressed in an intermediate form (a size increase similar to the larger sizes of compiled object codes as opposed to source codes).

Compiler

FIG. 1 is a schematic diagram of a compiler embodying the invention. UPC source code 10 is input to a compiler engine 20, which outputs compiled machine language (object) code 30. The compiler engine 20 has a Front End Module (FEM) 40 that performs certain processing steps (to be described), and passes an intermediate form of the UPC code to an Intermediate Form Processor (IFP) 42. The IFP 42 also loads and stores data from Run-Time Libraries (RTL) 44, and has a feedback loop 46 to the FEM 40. The output of the IFP 42 is passed to a Back End Module (BEM) 48 where it is processed then outputted as the compiled machine code 30.

The series FEM 40, IFP 42 and BEM 48 arrangment is common with standard C compilers. In such a conventional C compiler, a front end module converts the source code to an intermediate form. An intermediate form processor optimizes the intermediate form of the code by using standard procedures such as dead code elimination, strength reduction and loop invariant processing. A back end module converts the optimized intermediate form to machine code.

The FEM 30 and the IFP 42 operate on a two invocation approach. The two invocations will now be described, dealing with each of the categories of UPC construct mentioned above. Conventional C language program statements are handled in the conventional manner.

Data

Figure 2:
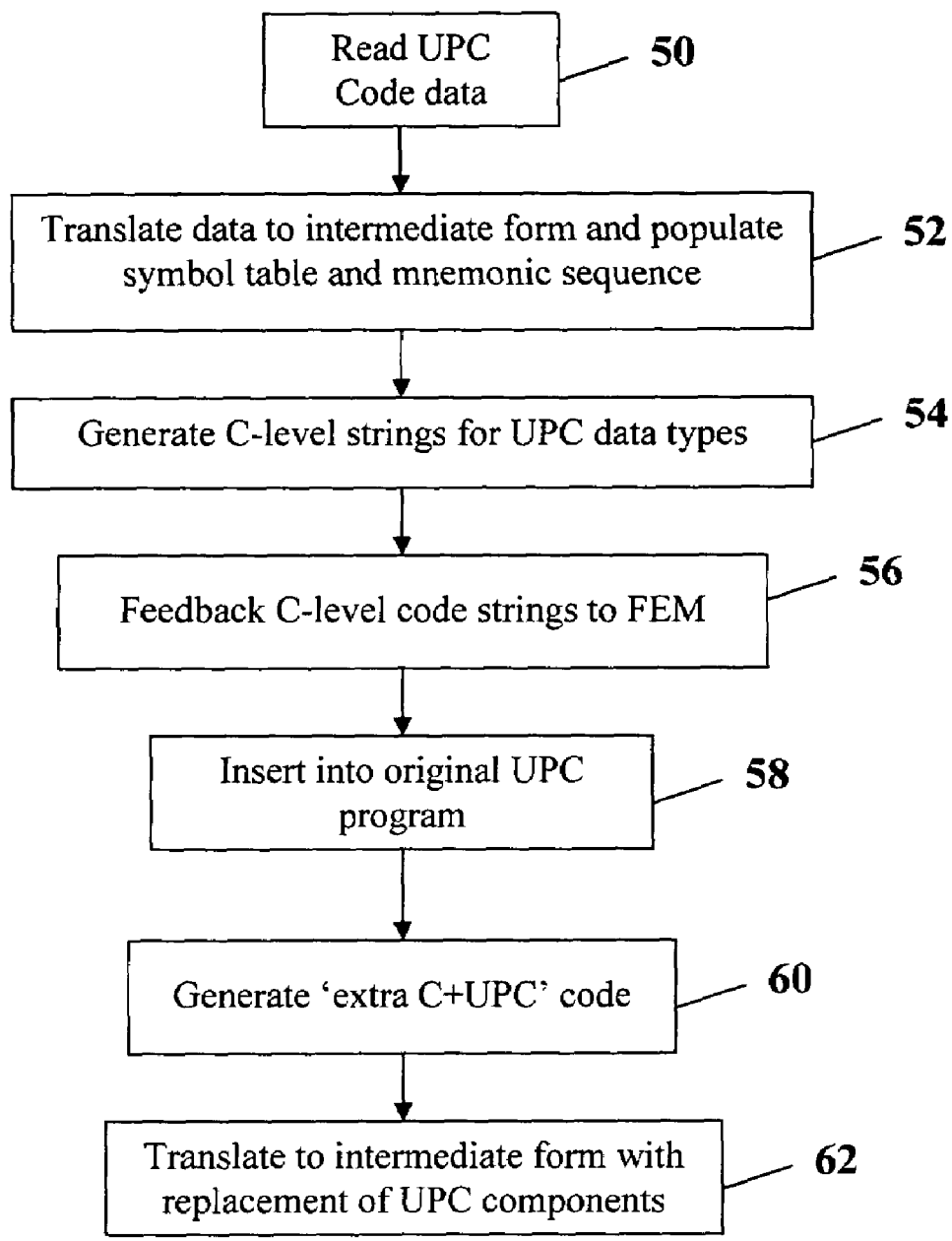
FIG. 2 is a flow diagram of the data handling process of the compiler of FIG. 1.

Referring now to the flow diagram of FIG. 2, the UPC source code is read in a first invocation by the FEM 40 (step 50) and UPC data types are translated to the intermediate form and populated in the FEM's symbol table and mnemonic sequence (step 52).

After this, the first invocation of the IFP 42 traverses the intermediate form's mnemonic sequence, searching for read/write references to the UPC data types, and generates C-level code strings (step 54) for them. The C-level strings cover aspects of accessing UPC data types such as declaration of proxy or handler data structures representing UPC data types. Functions provided by the RTLs 44 are referenced (invoked) in these C strings, as, for example, for initialization purposes. Discovery of all handler data structures (and the generation of their C strings) occurs within one pass of the IFP 42 over the intermediate code. Since the C code generated is subsequently to be spliced/appended to the original UPC code, it is necessary to generate unique names for the handler data structures that do not clash with the names declared in the original UPC program (else a second frontend pass will break with variable renaming errors). It is also necessary to keep track of the correspondence between handler names and original UPC variables for the purpose of later code generation.

In summary, the first invocation of the IFP 42 is an intermediate form code traversal to collect all the UPC shared entities for which initialization and declaration code has to be generated. At this stage, validation of the code and error-reporting is also carried out. C-level declaration/initialization code generation is then straightforward for all such entities. For each shared entity, a declaration of its proxy structure is carried out. The name of the proxy is a unique mangled version of its UPC cousin with a one-to-one mapping from the mangled version to its cousin.

The C-level strings corresponding to UPC data constructs are fedback by the loop 46 (step 56) and inserted into a copy of the original UPC program (step 58) before the second invocation or reuse of the FEM 40. The second invocation of the FEM 40 now proceeds. At this juncture, the code being handled by the FEM 40 comprises of both UPC constructs in the source code and the C strings that represent a translation of the UPC constructs to standard C code. The task for the second invocation of the FEM 40 and IFP 42 is to regularise this "duplication" of C and UPC code in a manner that only C code remains pertinent and in actual use, while UPC code becomes dead code that can be eliminated using optimization techniques. The FEM 40 generates intermediate form code for 'extra C+UPC' code (step 60). Thus code generation for the added C-strings occurs by a simple reuse of the machinery of the C compiler frontend.

Following this, a second invocation of the IFP 42 regularizes code duplication by traversing the mnemonic sequence again and shifting (by changing a UPC variable name to its mangled proxy cousin) each reference of a UPC variable to its corresponding handler data structure (step 62). As a result, all uses of UPC variables disappear and are replaced by uses of the proxy structures. The IFP 42 also expands reads and writes to UPC's shared distributed memory to RTL 44 function calls using the proxy structures. Declaration of UPC variables continue to remain, but they are unused and eligible for dead code elimination.

Consider the following example for a shared integer:
shared int xxx;
After the first invocation of the IFP 42 it's proxy declaration occurs as follows:

```
typedef struct shared_handle_int {
   unsigned short _global_mem_no;
   unsigned short _index;
      int initialization_value; } shared_handle_int_t;
   shared_handle_int_t xxx_h;
```

This construct can be perfectly processed in the second invocation of the FEM 40, as it is now a simple C data type. In the second invocation of the IFP 42, all references to xxx are replaced by its mangled cousin, which is xxx_h.

Consider a second, more complex example of a shared pointer:
int****shared**yyy;
After the first invocation of the IFP 42 its proxy is declared as:

```
typedef struct shared_handle_pointer {
   unsigned short _global_mem_no;
   unsigned short _index;
   short blocking_factor = 1;
      int * initialization_value; } shared_handle_pointer_t;
   shared_handle_pointer_t yyy_h;
```

All references to (*(*(*(*yyy)))) are replaced by yyy_h. The implicit annotation of yyy_h says that it is a shared pointer variable. The library functions are linked in the second invocation of the IFP 42.

This mapping is used in step 62, in substituting references to the UPC entity by its proxy structure. Both the UPC declarations and proxy declarations survive the two-step translation method, with only the proxies being the ones in actual use. In other words, the UPC shared declarations survive as dead code in the translation process. Such dead code (after being stripped of its intermediate-form annotational information) is left to basic compiler optimization (dead-code elimination). In addition, optionally, temporaries needed for the code generation in the step 62 (for reads/writes to shared entities) may also be anticipated and declared in advance as a set of global variables in the first IFP step that generates C-level code.

Statements

UPC forall processing can occur in either of the two FEM 40 invocations. It is conveniently described as taking place in the first invocation (but can equally occur in the second), wherein the FEM 40 carries out a complete translation of the UPC forall statement as follows:

UPC forall's syntax is:
upc_forall (expression$_{opt}$; expression$_{opt}$; expression$_{opt}$; affinity$_{opt}$) statement affinity: expression$_{opt}$|continue The high-level algorithm that is described below does one top-down pass over a UPC program and replaces UPC forall statements with C "for" loops and program text for forall related bookeeping. The choice of a top-down pass is solely for the sake of convenient description; a bottom-up pass version of the algorithm is possible, and may be preferred in some embodiments.

Figure 3:
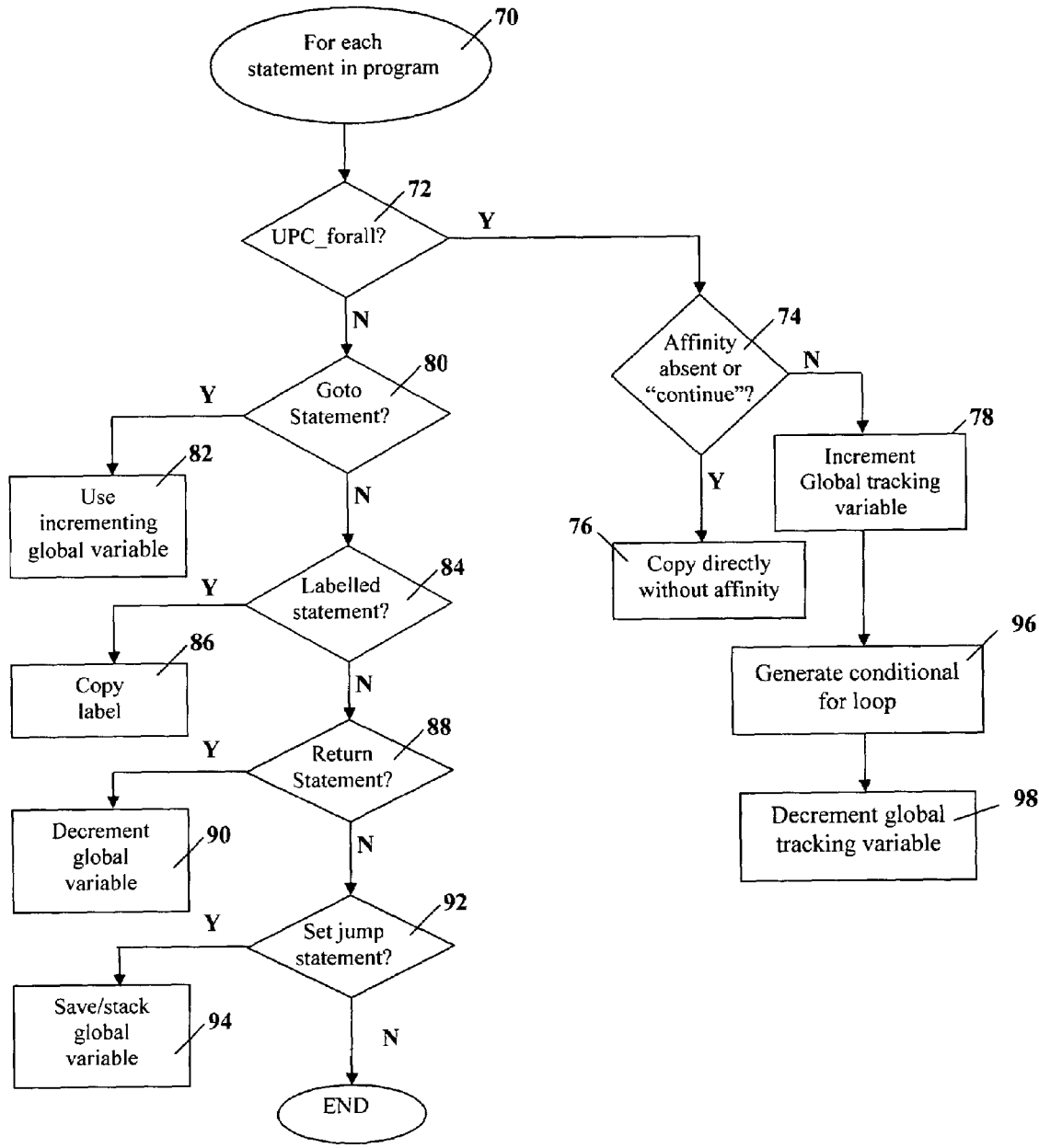
FIG. 3 is a flow diagram showing processing of statements (including forall statements) by the front end module of FIG. 1.

FIG. 3 is a flow diagram of the forall processing algorithm. The input code is traversed top down, and the output code obtained by copying the input code (it can also be obtained by in-place modification of the input code). The output code will, on occasions, be modified to be different from the input code.

Each statement (step 70) in the input code is tested. Step 72, determines whether the statement is a UPC forall. If Yes, then, in step 74, a further test of whether the forall is an ordinary upc_forall without affinity (or affinity being continue). Is Yes, then, in step 76, copying the forall into an ordinary "for" loop. If No, then further processing occurs, beginning with step 78. The body of the forall has to be sub-traversed as it may contain forall statements within itself.

To complete the process, for non 'UPC forall' statements, a test is performed, in step 80, of whether it is a goto statement. If Yes, then, in step 82, a code incrementing global variable is used having a diference in static nesting depth of label point and goto point followed by the jump. If No, then, in step 84, the test is performed of whether it is a labelled statement. If Yes, then, in step 86, the action is to copy the label into output code, but propogating the static nesting depth of the label to goto points. If No, then, in step 88, a test is performed of whether it is a return statement. If Yes, then, in step 90, the output code is decremented before the return by the static depth of the return point. If No, then, in step 92, the test is performed of whether it is a setjump statement. If Yes, then, in step 94, the output code has the global variable saved therein in a manner analogous to the saving of the called environment of setjmp. Also, the setjmp code is placed followed by a restore code for the global variable.

Affinity Handling

A upc_forall with any other affinity requires significant modification in the copying process. First, code for incrementing a thread-local, global, tracking variable of nesting depth has to be generated in the output code stream (step 78). Next, a 'for loop' corresponding to the forall is generated (step 96), with its body comprising of a conditional statement whose predicate leads to the forall body evaluation based upon an affinity test. The forall body has to be sub-traversed for further translation, and the sub-traversal has to be carried out noting the context of one static level deeper nesting (into a forall loop with non-continue affinity). After the 'for loop' generation, code for decrementing the global tracking variable is generated (step 98).

Forall Processing Algorithm

This algorithm corresponds to the process described above with reference to FIG. 3.

Input: A UPC program which may have upc_forall statements in all generality.

Output: A translated version of the input program into an equivalent program that does not have upc_forall statements.

Step 1: Define a thread-local global variable and copy it to output (i.e. translated) code stream:

unsigned int NestUpcforall_Depth=0;

In the UPC model, as a result of the above, each thread gets its own private copy of the variable to work with.

Step 2: Define an internal pre-processor variable. This variable is internal and is used solely in the pass described here. It is not copied on to the output stream.

Staticforall_Depth=0;

Step 3: For each translation unit (e.g. program file) making up the program, generate a translated version of each function definition as described below, while copying other declarations making up each translation unit as is to the output code stream. For each function definition that is encountered, do a top-down traversal, copying the input code stream to the output code stream unchanged, except for the constructs described below, whose output versions are modified versions of the input versions as follows:

Step 3a: For every "upc_forall (expressions$_{opt}$; expression$_{opt}$; expression$_{opt}$; affinity$_{opt}$) statement", (i) If the affinity expression is "continue" or absent, then in place of "upc_forall (expression$_{opt}$; expression$_{opt}$; expression$_{opt}$; affinity$_{opt}$) statement" in the input stream, insert "for (expression$_{opt}$; expression$_{opt}$; expression$_{opt}$) statement" into the output stream.

Statement in the above copying has to be sub-traversed (and copied with internal modification) as per the steps of this algorithm, so its copying above is highlighted by distinct underlining.

(ii) Else in place of "upc_forall (expression$_{opt}$; expression$_{opt}$; expression$_{opt}$; affinity$_{opt}$) statement" in the input stream, ---
insert
"{NestUpcforall_Depth ++;
for(expression$_{opt}$; expression$_{opt}$;expression$_{opt}$)
If(affinity == MYTHREAD || NestUPCforall_Depth !=1)
  Statement;
NestUpcforall_Depth --;}"
--- into output stream.

Statement in the above copying has to be sub-traversed (and copied with internal modification) as per the steps of this algorithm, so its copying above is underlined distinctly. For (and only for) this sub-traversal of statement, increment internally, the pre-processor variable Staticforall_Depth by 1. Affinity in the above is underlined in order to highlight the type-specific code generation needed for the same. As per the UPC language definition, if affinity is a reference to shared memory space, then upc_threadof(affinity) is to be used for affinity into the output stream above, and if affinity is an integer expression, then pmod(affinity, THREADS) is to be used, where pmod(a, b) evaluates as (a>=0)?(a% b):(((a% b)+b)% b). Whether the generated code uses a pmod function, or macro, or directly inlined code is left as a compiler option. Decrement the internal pre-processor variable Staticforall_Depth by one at the exit of UPC forall processing.

Step 3b: In place of every goto statement with label "L1",

---
insert "NestedUpcforall_Depth += Staticforall_Depth_Difference;
  goto L1;"
--- into output stream.

Staticforall_Depth_Difference is a statically generated constant that is underlined in the above to highlight its careful generation as follows. It is the value of the internal pre-processor variable Staticforall_Depth at the point where label L1 exists in the input code, minus the value of Staticforall_Depth at the current point (i.e. the goto statement). The value of Staticforall_Depth at labels can be made available to all goto points (directly, or by straightforward backpatching) by storing the same in a symbol table.

Step 3c: Copy every label statement "L1: stmt" from input stream as is to the output stream, but make the Staticforall_Depth value at the statement point available to all gotos via the symbol table, as discussed in step 3b above.

Step 3d: For every "return stmt" in the input stream,

---
Insert "NestedUpcforall_Depth -= Staticforall_Depth;
  return stmt"
--- to the output stream. Staticforall_Depth is underlined in the above, in order to highlight that the value of the internal pre-processor variable is inlined as a constant in the output code above.

Step 3e: For every "setjmp(buf)" statement from input stream,

---
insert "unsigned int Backup_NestedUpcforall_Depth = NestedUpcforall_Depth;
  setjmp(buf);
  NestedUpcforall_Depth = Backup_NestedUpcforall_Depth;"
--- into the output stream.

Backup_NestedUpcforall_Depth is underlined in the above to highlight that the forall processing has to use a unique name (e.g. generated using gensym()) for each setjmp in order to avoid name conflicts in the output code.

Synchronization Constructs

These form of UPC constructs are handed in the C-level code strings generated in the first invocation of the IFP 42 and by the library functions of the RTL 44 in the second invocation of the IFP 42.

Back End Module Invocation

The resultant intermediate form code now no longer contains any UPC unique constructs, but rather includes substitute data structures containing specific UPC tags and data, and only standard C statements. Such intermediate form code can be directly processed into machine code by the BEM 48.

Computer Platform

Figure 4:
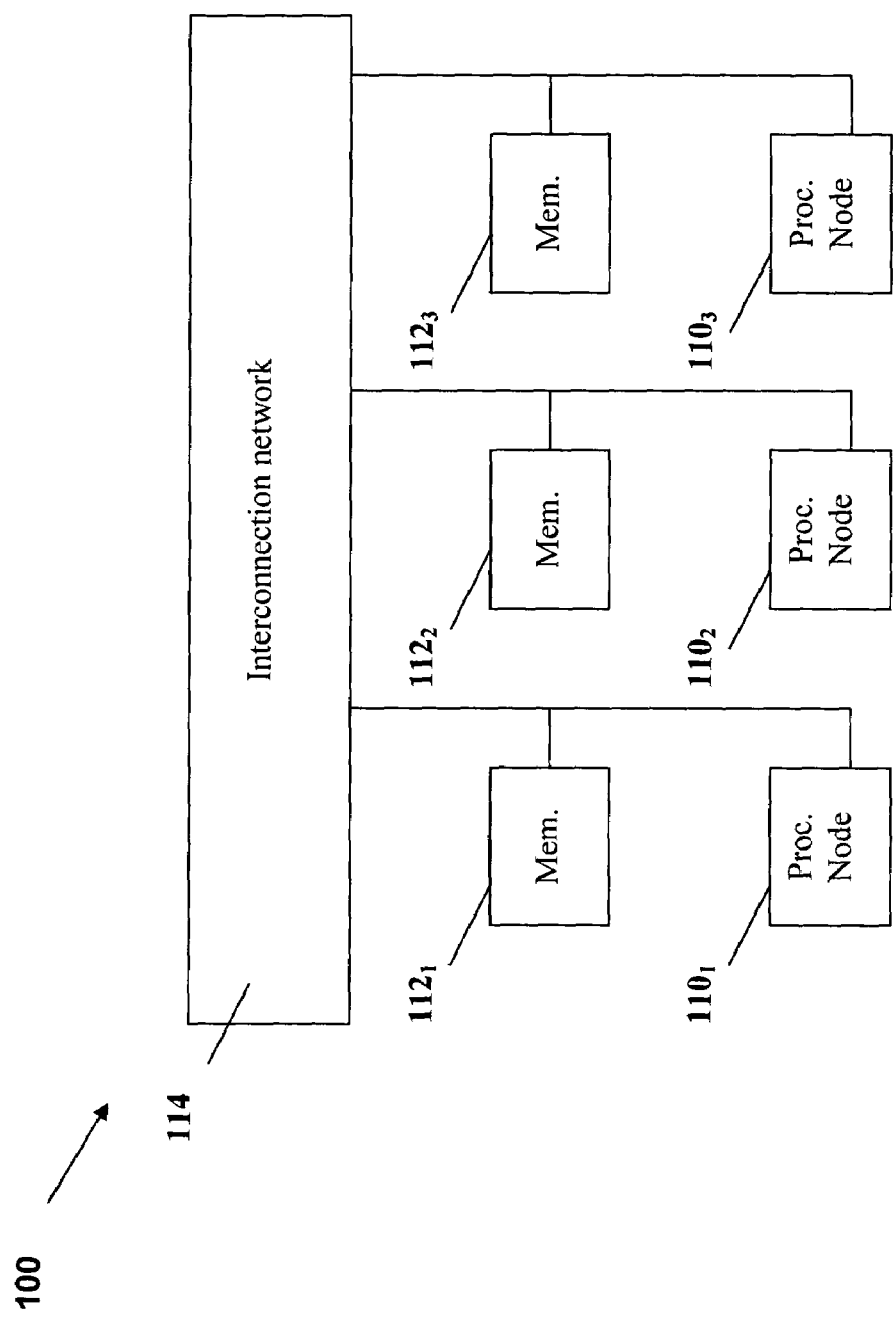
FIG. 4 is a schematic representation of a parallel computer system having a distributed shared memory architecture suitable for supporting a compiler embodying the invention.

FIG. 4 is a schematic representation of a computer system 100 that can be used to implement the techniques described herein.

UPC is defined for parallel computers with distributed shared memory architecture. The computer system 100 has plural processor nodes 110$_n$, each associated with a physical memory store 112$_n$. In the present example, n=3, but other values are equally possible. An interconnection network 114 interconnecting all node/memory pairs 110/112. A single global real address space exists across the whole system 100, typically achieved by intermediation by the processor nodes. Thus, all of the physical memory 112$_n$ is addressable from any node 110$_n$, and any node can perform a load or a store instruction to any part of the real address space. Typically there is a separate, but tightly connected operating system (or micro-kernel) image on each node 110$_n$. The connection is achieved at least at the virtual memory manager level to ensure the single global real address space. The operating system image software at each node 110$_n$ includes the compiler as herein described.

Conclusion

A method, computer software and a computer system are each are described herein in the context of compiling UPC-language programs.

Besides reducing UPC-related code generation size, there is the advantage of being able to work largely at the human-readable, and well-known/standard C language level as opposed to a nonstandard/proprietary (i.e. a compiler vendor specific) low-level intermediate form, with its typical optimization-oriented features that are orthogonal to the purpose of translating UPC code and only serve to make the task harder. The solution is able to reuse the compiler vendor's frontend code extensively, for translating the (generated) C strings to intermediate form and for taking care of optimization information. The automation in intermediate code generation that is able to be obtained thus reduces the complexity faced in digesting UPC annotations substantially. For example, all of the (extensive) initialization code for UPC data types is expressed completely within C strings in the disclosed method and no intermediate code needs to be generated/manipulated directly for this purpose. The overall result is a minimally modified standard C compiler for that is also capable of translating UPC programs to executable object codes.

Various alterations and modifications can be made to the techniques and arrangements described herein, as would be apparent to one skilled in the relevant art.

We claim:

1. A method for compiling Unified Parallel C-language (UPC) source code containing UPC-unique constructs and C-language constructs, said method comprising:
    translating said UPC source code into a first intermediate form;
    generating proxy form C-language code strings of data components within said first intermediate form;
    inserting said generated code strings into said UPC source code to form a combined code;
    translating said combined code into a second intermediate form, wherein any references to said UPC-unique constructs are replaced by references to corresponding proxy components in associated program text, and surviving UPC-unique constructs are discarded; and
    convening said second intermediate form to compiled machine code.

2. The method of claim 1, wherein said code strings are proxy declarations.

3. The method of claim 2, wherein each said proxy declaration includes a name that is a mangled version of a name of a respective UPC-unique data component having a one-to-one mapping.

4. The method of claim 1, wherein said associated program text includes a conditional statement.

5. The method of claim 4, wherein said UPC-unique constructs are forall statements, and said associated program text includes a conditional statement whose predicates leads to evaluation based upon an affinity test.

6. The method of claim 5, wherein, for forall statements having an affinity other than continue, the translation step includes sub-traversal of a forall body and determining the context of each static level of nesting.

7. The method of claim 6, further comprising incrementing a depth variable in accordance wit each said sub-traversal.

8. A method for compiling Unified Parallel C-language (UPC) source code, said method comprising:
    converting UPC-unique constructs into C-level form;
    inserting said C-level constructs into said source code to form a combined code;
    translating said combined code to an intermediate form, wherein any surviving UPC-unique components are discarded; and
    converting said intermediate form to compiled machine code.

9. The method of claim 8, wherein said C-level form constructs are in a form having proxy declarations.

10. The method of claim 9, wherein each said proxy declaration for a UPC-unique data construct includes a name that is a mangled version of a name of the respective UPC-unique data component having a one-to-one mapping.

11. The method of claim 9, wherein said proxy declaration for a UPC-unique statement includes a conditional statement.

12. The method of claim 11, wherein, for forall statements, said conditional statement has predicates leading to evaluation based upon an affinity test.

13. A program storage device readable by computer, tangibly embodying a program of instructions executable by said computer to perform a method for compiling Unified Parallel C-language (UPC) source code containing UPC-unique constructs and C-language constructs, said method comprising:
    translating said UPC source code into a first intermediate form;
    generating proxy form C-language code strings of data components within said first intermediate form;
    inserting said generated code strings into said UPC source code to form a combined code;
    translating said combined code into a second intermediate form, wherein any references to said UPC-unique constructs are replaced by references to corresponding proxy components in associated program text and surviving UPC-unique constructs are discarded; and
    converting said second intermediate form to compiled machine code.

14. The program storage device of claim 13, wherein said code strings are proxy declarations.

15. The program storage device of claim 14, wherein each said proxy declaration includes a name that is a mangled version of a name of a respective UPC-unique data component having a one-to-one mapping.

16. The program storage device of claim 13, wherein said associated program text includes a conditional statement.

17. The program storage device of claim 16, wherein said UPC-unique constructs are forall statements, and said associated program text includes a conditional statement whose predicates leads to evaluation based upon an affinity test.

18. The program storage device of claim 17, wherein, for forall statements having an affinity other than continue, the translation step includes sub-traversal of a forall body and determining the context of each static level of nesting.

19. The program storage device of claim 18, wherein said method further comprises incrementing a depth variable in accordance with each said sub-traversal.

20. A Unified Parallel C-language (UPC) compiler system comprising:
   plural parallel processor nodes, a front end module operable for receiving UPC source code;
   an intermediate form processor operable for converting UPC-unique constructs into C-level form, wherein said intermediate form processor loads and stores data from run-time libraries from any said processor node;
   a feedback loop to said front end module,
   wherein said front end module further inserts said C-level constructs into said source code to form a combined code;
   wherein said intermediate form processor translates said combined code to an intermediate form, wherein any surviving UPC-unique components are discarded; and
   a back end module operable for converting said intermediate form to compiled machine code.

21. The compiler of claim 20, wherein said C-level form constructs are in a form having proxy declarations.

22. The compiler of claim 21, wherein a each said proxy declaration for a UPC-unique data construct includes a name that is a mangled version of a name of a respective UPC-unique data component having a one-to-one mapping.

23. The compiler of claim 21, wherein said proxy declaration for a UPC-unique statement includes a conditional statement.

24. The compiler of claim 23, wherein, for forall statements, said conditional statement has predicates leading to evaluation based upon an affinity test.

25. The compiler of claim 24, wherein, for forall statements having an affinity other than continue, the intermediate form processor translates by sub-traversal of a forall body and determination of the context of each static level of nesting.

26. The compiler of claim 25, wherein the intermediate form processor increments a depth variable in accordance with each said sub-traversal.

27. A program storage device readable by computer, tangibly embodying a program of instructions executable by said computer to perform a method for compiling Unified Parallel C-language (UPC) source code, said method comprising:
   converting UPC-unique constructs into C-level form;
   inserting said C-level constructs into said source code to form a combined code;
   translating said combined code to an intermediate form, wherein any surviving UPC-unique components are discarded; and
   convening said intermediate form to compiled machine code.

28. The program storage device of claim 27, wherein said C-level form constructs are in a form having proxy declarations.

29. The program storage device of claim 28, wherein each said proxy declaration, for a UPC-unique data construct includes a name that is a mangled version of a name of the respective UPC-unique data component having a one-to-one mapping.

30. The program storage device of claim 28, wherein said proxy declaration for a UPC-unique statement includes a conditional statement.

31. The program storage device of claim 30, wherein, for forall statements, said conditional statement has predicates leading to evaluation based upon an affinity test.

32. A parallel distributed shared memory computer system having a single real address space, comprising:
   a plurality of processor modules;
   a memory unit associated with each processor module; and
   an interconnection network linking all processor modules and memory units;
   wherein each processor module includes a Unified Parallel C-language (UPC) compiler module, each said UPC compiler module including:
      a front end module operable for receiving UPC source code;
      an intermediate form processor operable for converting UPC-unique constructs into C-level form;
      a feedback loop to said front end processor,
      wherein said front end module further inserts said C-level constructs into said source code to form a combined code;
      wherein said intermediate form processor translates said combined code to an intermediate form, wherein any surviving UPC-unique components are discarded; and
      a back end module operable for converting said intermediate form to compiled machine code.

33. The computer system of claim 32, wherein said C-level form constructs are in a form having proxy declarations.

34. The computer system of claim 33, wherein each said proxy declaration for a UPC-unique data construct includes a name that is a mangled version of a name of the respective UPC-unique data component having a one-to-one mapping.

35. The computer system of claim 33, wherein said proxy declaration for a UPC-unique statement includes a conditional statement.

36. The computer system of claim 35, wherein, for forall statements, said conditional statement has predicates leading to evaluation based upon an affinity test.

* * * * *